US010333750B2

(12) United States Patent
de Ruijter (10) Patent No.: US 10,333,750 B2
(45) Date of Patent: Jun. 25, 2019

(54) RECEIVER WITH PHY SWITCH BASED ON PREAMBLE

(71) Applicant: Silicon Laboratories, Inc., Austin, TX (US)

(72) Inventor: Hendricus de Ruijter, Sunnyvale, CA (US)

(73) Assignee: Silicon Laboratories Inc., Austin, TX (US)

(*) Notice: Subject to any disclaimer, the term of this patent is extended or adjusted under 35 U.S.C. 154(b) by 60 days.

(21) Appl. No.: 15/237,137

(22) Filed: Aug. 15, 2016

(65) Prior Publication Data

US 2018/0048499 A1    Feb. 15, 2018

(51) Int. Cl.
| | |
|---|---|
| H01J 9/00 | (2006.01) |
| H04L 27/00 | (2006.01) |
| H04W 8/00 | (2009.01) |
| H04W 74/00 | (2009.01) |
| H04L 27/20 | (2006.01) |
| H04W 84/18 | (2009.01) |

(52) U.S. Cl.
CPC ...... *H04L 27/0008* (2013.01); *H04L 27/0012* (2013.01); *H04L 27/2017* (2013.01); *H04L 27/2082* (2013.01); *H04W 8/005* (2013.01); *H04W 74/002* (2013.01); *H04W 84/18* (2013.01)

(58) Field of Classification Search
USPC ....... 370/338, 328, 329, 203, 204, 319, 330, 370/343, 422, 436, 449, 465, 478
See application file for complete search history.

(56) References Cited

U.S. PATENT DOCUMENTS

| | | | | |
|---|---|---|---|---|
| 2004/0218568 | A1* | 11/2004 | Goodall | H04L 1/0002 370/332 |
| 2007/0047666 | A1* | 3/2007 | Trachewsky | H04L 1/0006 375/267 |
| 2009/0135772 | A1* | 5/2009 | Kwon | H04W 72/0406 370/329 |
| 2010/0303183 | A1* | 12/2010 | Desai | H04B 1/1027 375/350 |
| 2013/0202014 | A1* | 8/2013 | Schmidl | H04B 1/707 375/147 |
| 2014/0036702 | A1* | 2/2014 | Van Wyk | H04B 3/46 370/252 |

(Continued)

FOREIGN PATENT DOCUMENTS

WO    WO 2017/196220 A1 *  11/2017 .............. H04L 27/00

*Primary Examiner* — Phuongchau Ba Nguyen
(74) *Attorney, Agent, or Firm* — Nields, Lemack & Frame, LLC (57) ABSTRACT

A system for automatically detecting the PHY mode based on the incoming preamble is disclosed. The system includes a multimode demodulator, which includes a preamble detector and a demodulator. The preamble detector is used to determine when the preamble has been received and the PHY mode being used by the sending node. An indication of the PHY mode is supplied to the demodulator, which then decides the incoming bit stream in accordance with the detected PHY mode. In some embodiments, one demodulator, capable of decoding the bit stream in accordance with a plurality of PHY modes is employed. In other embodiments, the system includes a plurality of demodulators, where each is dedicated to one PHY mode.

12 Claims, 8 Drawing Sheets

(56) References Cited

U.S. PATENT DOCUMENTS

2015/0237178 A1* 8/2015 Zhang .................... H04L 69/22
370/328
2016/0241425 A1* 8/2016 Xin ..................... H04L 27/3455

* cited by examiner

RECEIVER WITH PHY SWITCH BASED ON PREAMBLE

This disclosure describes systems and methods allowing a single receiver to receive signals transmitted using a plurality of physical modes and determine which PHY mode the received signals are using based on the preamble.

BACKGROUND

Some communication protocols utilize multiple transmission modes. Often, these modes are developed to allow increased bandwidth or signal to noise ratios. These protocol enhancements occur in the physical layer of the network, which is often referred to as the PHY.

For example, Ethernet has evolved from 10 Mbps to 1 Gps. Other protocols, such as USB and others, have also experienced an evolution in bandwidth. Often, a negotiation is conducted between two nodes to determine which of the plurality of transmission modes should be used. For example, each node may default to a PHY mode which all nodes must accommodate. Messages may then be sent between two nodes using this default PHY mode to determine whether a different PHY mode can be employed.

This trend also exists within wireless protocols. For example, Bluetooth has recently introduced higher bandwidth versions, such as Bluetooth 2.0, Bluetooth 3.0 and BLE (Bluetooth Low Energy). As suggested above, a negotiation is conducted between Bluetooth devices to determine the PHY mode that will be used for transmission between the two devices. For example, Bluetooth defines a sequence of packet data units (PDUs) that are exchanged between a master and slave to determine the optimal PHY protocol to use. For example, the master will send the slave a PHY request PDU. That PHY request PDU contains the preferred PHY mode that the master wishes to use for transmission and receipt. In response, the slave transmits a PHY response PDU. That response contains the preferred PHY mode that the slave wishes to use for transmission and receipt. The master then determines the optimal PHY modes to use for transmission in each direction based on the contents of the two PDUs. That determination is transmitted to the slave using a PHY update PDU. From this point forward, communications between the master and slave take place using these negotiated PHY mode settings.

This negotiation is inefficient as it requires several PDUs to be transmitted between the master and slave before a PHY mode switch can be initiated.

It would be beneficial if there were a system where the PHY mode could be automatically detected and the receiver could automatically switch to that detected PHY mode. Such a system would eliminate the need for inefficient and time consuming negotiations between devices.

SUMMARY

A system for automatically detecting the PHY mode based on the incoming preamble is disclosed. The system includes a multimode demodulator, which includes a preamble detector and a demodulator. The preamble detector is used to determine when the preamble has been received and the PHY mode being used by the sending node. An indication of the PHY mode is supplied to the demodulator, which then decides the incoming bit stream in accordance with the detected PHY mode. In some embodiments, one demodulator, capable of decoding the bit stream in accordance with a plurality of PHY modes is employed. In other embodiments, the system includes a plurality of demodulators, where each is dedicated to one PHY mode.

In another embodiment, the method of negotiating a PHY mode to be used for wireless communications between two nodes is disclosed. The method comprises sending a first packet from a sending node to a receiving node using a first PHY mode; receiving, at the sending node, a response to the first packet from the receiving node, containing an indication of link quality between the sending node and the receiving node; selecting a PHY mode, at the sending node, for a second packet based on the link quality; sending a second packet from the sending node to the receiving node using the selected PHY mode; and determining automatically, at the receiving node, the PHY mode used for the second packet based on a preamble of the second packet. In certain embodiments, the selected PHY mode has a higher effective information bit rate than the first PHY mode when the link quality exceeds a predetermined first threshold. In certain embodiments, the selected PHY mode has a lower effective information bit rate than the first PHY mode when the link quality is less than a predetermined second threshold.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
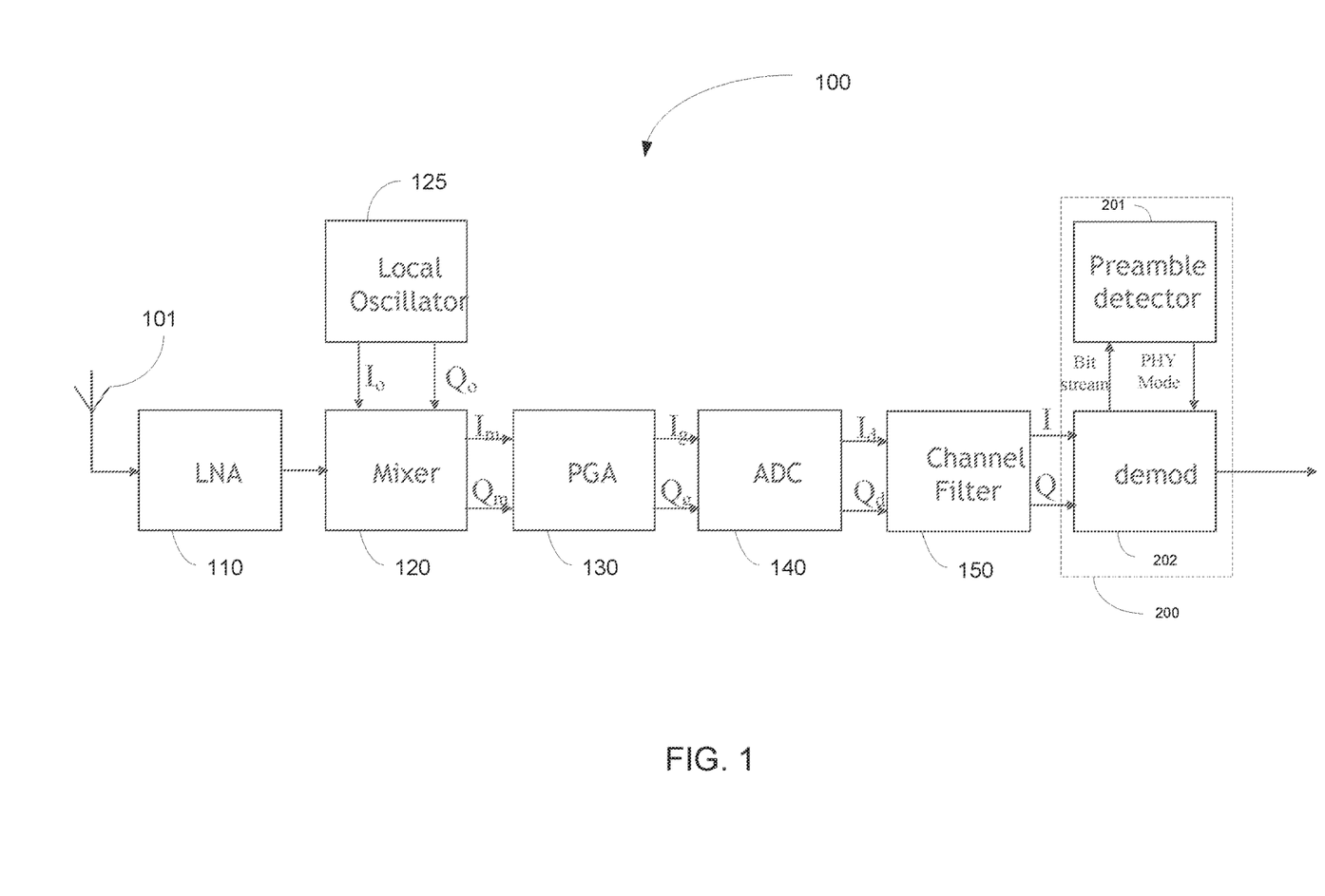
FIG. 1 is a block diagram of a system having a receiver having the ability to detect multiple PHY modes.

FIG. 1 shows a block diagram of a system 100 having a wireless receiver which is capable of detecting one of a plurality of PHY modes based on the preamble of the incoming packet.

Figure 2:
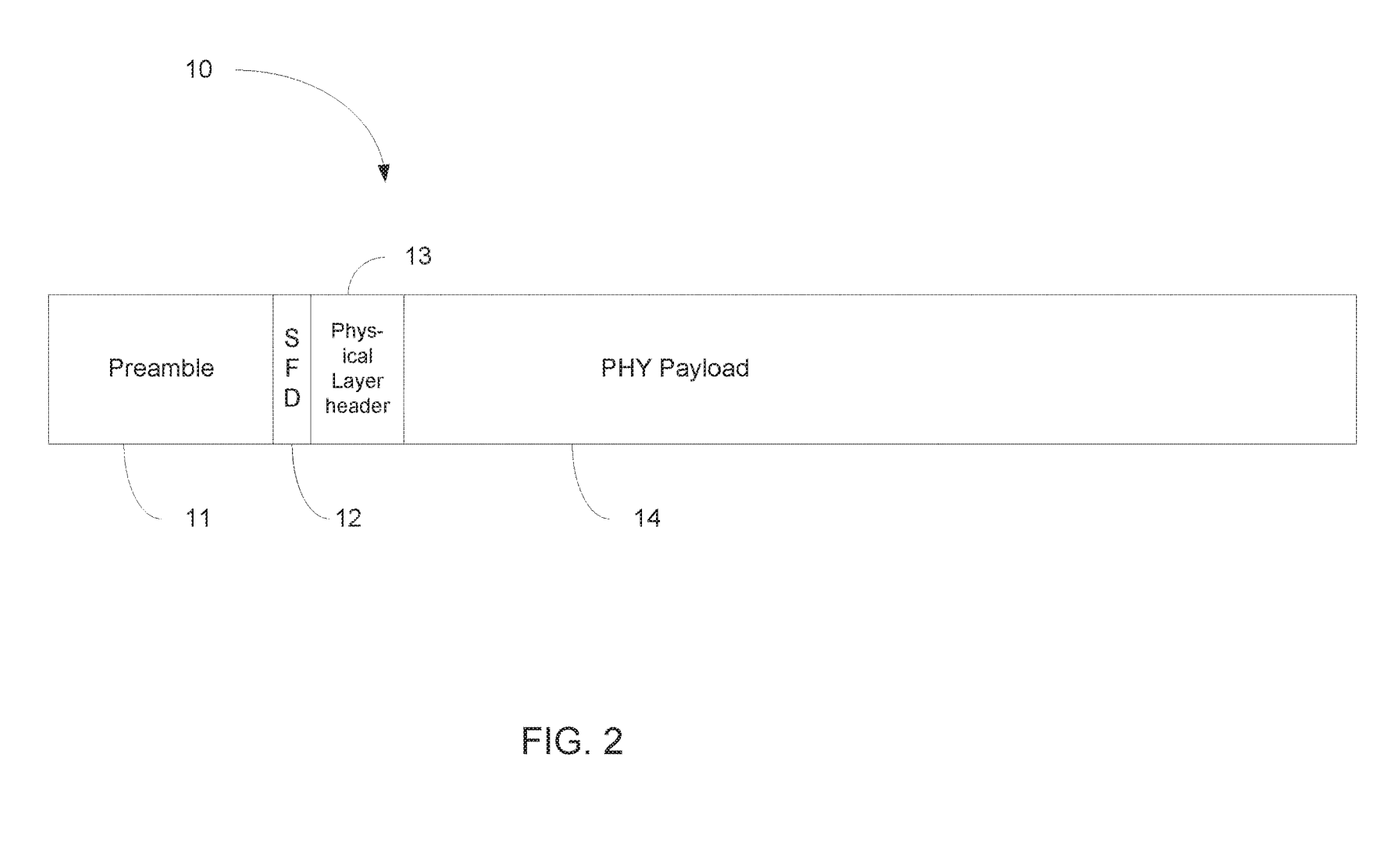
FIG. 2 shows the format of a representative message transmitted to the system of FIG. 1.

FIG. 2 shows the format of a representative packet that may be received by the system of FIG. 1. Packet 10 includes a preamble 11. The preamble is used to denote the start of a packet and may have a predetermined bit sequence. The SFD (synchronization field delimiter) 12 is used to denote the end of the preamble 11 and represents the boundary between the preamble 11 and the physical layer header 13. The physical layer header 13 may be one or two bytes and represents the total length of the frame. Of course, the physical layer header 13 may be longer, if desired. Following the physical layer header 13 is the PHY payload 14, which, in some embodiments, may be up to 2048 bytes.

FIG. 2 represents the actual data that is in each field. However, prior to transmission, this data may be encoded into another format.

Certain encoding schemes, such as the O-QPSK PHY defined in IEEE802.15.4-2015 that utilizes spread spectrum DSSS (Direct-sequence spread-spectrum) and O-QPSK (offset-quadrature phase shift keying), convert the data into a different sequence of bits prior to transmission. For example, the O-QPSK PHY is based on spread spectrum DSSS, which uses a concept known as symbols, where each symbol represents 4 bits, and where each symbol is represented by 32 chips.

The O-QPSK PHY uses a chip rate of 2 Mcps. Four information bits are transmitted every 32 chips resulting in an actual bit rate of 250 kbps.

MSK (minimum shift keying) is a special case of offset QPSK (O-QPSK.). In MSK, every chip in O-QPSK modulation can be considered a symbol containing an information bit. Thus, in MSK, the information rate is the same as the on-air modulation rate.

Thus, it is possible that two or more PHY modes may operate at the same on-air bit rate. While the on-air bit rate is the same, the demodulation of the data in these PHY modes is completely different.

The modulation processes of MSK and O-QPSK are similar. According to one method, the data to be transmitted is separated into odd and even bit streams, $D_{odd}$ and $D_{even}$. One of these bit streams is referred to as the inphase stream, or I-phase, while the other bit steam is referred to as the quadrature phase, or Q-phase. By conventional, the even bits are typically referred to as the I-phase. The output signal, or S(t), is generated by multiplying the even bit stream by the cosine of the carrier frequency, $F_{carrier}$, and the odd bit stream by the sine of the carrier frequency. In other words:

$$S(t)=D_{even}(t)*\cos(F_{carrier})+D_{odd}(t)*\sin(F_{carrier})$$

According to another method, the modulation is accomplished by modulating a frequency synthesizer. Every chip, in O-QPSK, or every symbol, in MSK, is modulated by changing the frequency such that the phase shifts by + or −90 degrees per chip or symbol for O-QPSK and MSK respectively. GMSK (Gaussian Minimum Key Shifting) can be generated with this method by preceding the modulation with a Gaussian filter. The Gaussian filter helps to reduce undesired side band emissions.

Having provided a basic description of wireless communications, the structure of the system will now be described.

FIG. 1 shows a system 100 capable of receiving input data transmitted using one of a plurality of PHY modes. The wireless signals first enter the system 100 through antenna 101. The antenna 101 is in electrical communication with a low noise amplifier (LNA) 110. The LNA 110 receives a very weak signal from the antenna 101 and amplifies that signal while maintaining the signal-to-noise ratio (SNR) of the incoming signal.

The amplified signal is then passed to a mixer 120. The mixer 120 is also in communication with a local oscillator 125, which provides two phases to the mixer 120. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$.

The inphase signal, $I_m$, and the quadrature signal, $Q_m$, from the mixer 120 are then fed into programmable gain amplifier (PGA) 130. The PGA 130 amplifies the $I_m$ and $Q_m$ signals by a programmable amount. These amplified signals are referred to as $I_g$ and $Q_g$ in FIG. 1.

The amplified signals, $I_g$ and $Q_g$, are then fed from the PGA 130 into an analog to digital converter (ADC) 140. The ADC 140 converts these analog signals to digital signals, $I_d$ and $Q_d$. These digital signals may then pass through a channel filter 150. The filtered signals, I and Q, then enter the multimode demodulator 200.

FIG. 1 shows one set of components that may be used for the conversion of the wireless received signal from the antenna 101 to the multimode demodulator 200. However, it is noted that one or more of these components may be omitted. Further, functions that are described as being performed in different components may be combined into one component, if desired. Thus, FIG. 1 shows an illustrative diagram of the processing of the wireless signal prior to the multimode demodulator 200. However, other configurations are also possible and the disclosure is not limited to this particular embodiment.

The multimode demodulator 200 is, at a high level, comprised of two components, a preamble detector 201 and a demodulator 202.

As described above, the preamble is the first part of the packet to be transmitted. In certain embodiments, the preamble is predefined as a fixed sequence. For example, the O-QPSK PHY as defined in IEEE802.15.4-2015 defines the preamble as four bytes of all zeros. These four bytes are converted into 8 symbols, where each symbol represents 4 bits. The symbols are then converted to chips. The chip sequence associated with a symbol that represents four zeros is as follows:

11011001110000110101001000101110

Thus, the preamble of a packet encoded using DSSS is the above sequence repeated 8 times, for a total of 256 chips. Of course, the preamble shown above is provided for illustrative purposes. The disclosure is not limited to any particular preamble or encoding scheme.

Another PHY mode, such as GMSK, may define a different preamble, which is easily differentiated from the above preamble. For example, the second preamble may be:

01010101010101010101010101010101

Like the first preamble, the sequence shown above may be repeated eight times. Of course, other preamble patterns may also be used and the disclosure is not limited to this embodiment.

In FIG. 1, the preamble detector 201 is used to determine whether a preamble is present in the incoming data stream, and if so, which preamble it is. For example, the I and Q signals are reassembled into a single bit stream, which enters the preamble detector 201. This may be achieved by demodulation of the I and Q signals and provide the demodulated bit stream to the preamble detector 201.

The preamble detector 201 compares the incoming bit stream to the predetermined patterns associated with each of the preambles for the different PHY modes. If a match is detected, the preamble detector 201 asserts a PHY MODE signal indicating which PHY mode has been received. This PHY MODE signal is used to configure the demodulator 202 so that it uses the appropriate demodulation technique to recover the original data. Once demodulated, the output may be transmitted to other components in the device, where the demodulated data is further processed.

FIG. 1 shows a multimode demodulator 200 that includes a preamble detector 201 and a demodulator 202. The preamble detector 201 may be capable of detecting at least one of a plurality of preambles. For example, the preamble detector 201 may include a plurality of comparators, which compare each bit of the incoming bit stream to the predefined preamble field. This may be implemented using dedicated circuitry, or may utilize a digital signal processor (DSP) in conjunction with associated circuitry. The outputs from these comparators may be used by control logic, which determines whether the incoming bit stream is sufficiently close to the predefined preamble pattern to indicate a match. For example, the preamble field may have 256 chips, as described earlier. The control logic may require that the number of chips that match the predefined preamble pattern exceed a certain threshold, such as 80% or 90%. This logic is replicated for each preamble that the preamble detector 201 is configured to detect. Preamble detectors are well known in the art and the disclosure is not limited to this configuration; other embodiments may also be employed.

The demodulator 202 must be able to demodulate data according to all of the different PHY modes supported by the multimode demodulator 200. The preamble detector 201 provides an indication to the demodulator 202 as to which PHY mode is to be used. The demodulator 202, using the selected PHY mode, then scans the incoming bit stream to find the SFD 12. The demodulator 202 may, in some embodiments, convert the serial bit stream to a sequence of bytes before the data exits the demodulator 202. In other embodiments, a decoded bit stream is output from the demodulator 202. In certain embodiments, the demodulator 202 may, for example, include a digital signal processor (DSP) that is configured to receive several PHY modes. The demodulator 202 may further include a first part, comprising circuitry used to assist the DSP in demodulating the first PHY mode and a second part, comprising circuitry used to assist the DSP in demodulating the second PHY mode. In other embodiments, the demodulator 202 may be a dedicated circuit, having a first part for demodulating the first PHY mode and a second part for demodulating the second PHY mode. In certain embodiments, regardless of the implementation, the first and second parts may be independently put into low power mode.

It is desirable to have the preambles significantly different from one another to minimize "false positives", where the preamble detector 201 erroneously indicates the incorrect PHY mode. The required separation between the two preambles may be a function of SNR or other parameters.

It is also desirable that the modulation bandwidths of the supported PHY modes are similar so that the receiver chain, including the channel filter, can be kept unchanged. However, an additional benefit of the disclosure is that the preamble detector can be used to adapt the bandwidth of the channel filter to the bandwidth of the received PHY mode. In other words, an output from the preamble detector 201 may be used as an input by the channel filter 150 to adjust the bandwidth of that channel filter.

The multimode demodulator 200 may be implemented in a number of ways. FIG. 1 shows a single preamble detector 201 which is capable of detecting each of the possible preambles. FIG. 1 also shows a single demodulator 202 that is capable of demodulating the input bit stream in accordance with any of the supported PHY modes.

Figure 3:
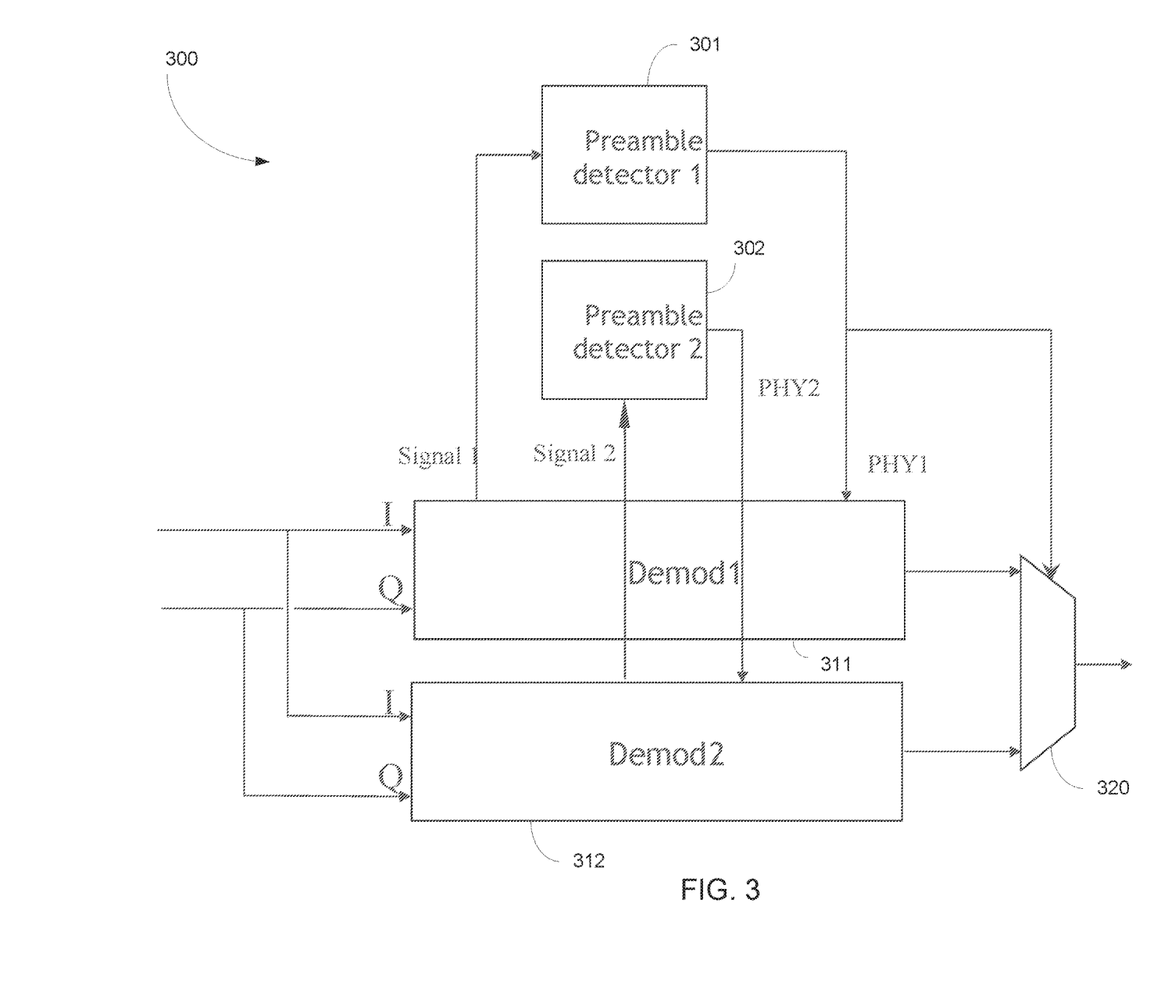
FIG. 3 is a block diagram of preamble detector and demodulator according to one embodiment.

However, other embodiments are also possible. FIG. 3 shows another embodiment of a multimode demodulator 300. This embodiment includes two preamble detectors; a first preamble detector 301 and a second preamble detector 302. Each preamble detector is configured to receive the incoming bit stream and determine whether that incoming bit stream matches the predefined preamble pattern for its respective PHY mode. When one of the preamble detectors determines that it has received the preamble associated with its PHY mode, it sends an indication to its associated demodulator.

The multimode demodulator 300 also comprises two demodulators; a first demodulator 311 associated with the first preamble detector 301; and a second demodulator 312 associated with the second preamble detector 302. The first demodulator 311 is able to decode the incoming bit stream in accordance with the first PHY mode and generates an output, Signal 1, to the first preamble detector 301. The second demodulator 312 is able to decode the incoming bit stream in accordance with the second PHY mode and generates an output, Signal 2, to the second preamble detector 302. The first demodulator 311 and the second demodulator 312 may each be dedicated circuits, or may each include a DSP having associated circuitry to demodulate the respective PHY mode. As described above, the demodulators may output either decoded serial data or a sequence of bytes to the multiplexer 320. The first preamble detector 301 and the second preamble detector 302 scan Signal 1 and Signal 2, respectively.

Signal 1 and Signal 2 are derived from the I and Q signals. In certain embodiments, Signal 1 and Signal 2 may be differentiated phase signals, RSSI, demodulated signals, the received I and Q signals, or a combination thereof. Other representations for Signal 1 and Signal 2 may also be used by the preamble detectors, and the disclosure is not limited to any particular implementation. Further, if the Signal 1 and Signal 2 signals are different than the I and Q signals, the creation of the Signal 1 and Signal 2 may be performed within the demodulators.

The outputs from the two demodulators are fed into a multiplexer 320, which selects the output stream from one of the two demodulators to be forwarded to the rest of the system. The selection is made by a signal from one of the preamble detectors.

Note that, in certain embodiments, the demodulators are constantly operating. In those embodiments, it may not be necessary to provide an indication of the PHY mode to each demodulator. Rather, only the multiplexer 320 may require the PHY mode indication signal.

In other embodiments, to save power, a demodulator is only activated if the incoming data stream uses the PHY mode that that demodulator is associated with. In other words, the preamble detectors are operational and when a preamble is detected, the PHY mode signal for that PHY mode is asserted by the associated preamble detector. The assertion of this PHY mode signal activates the demodulator associated with that preamble detector. For example, when the incoming bit stream arrives, the first demodulator 311 and the second demodulator 312 are both in low power mode. The first preamble detector 301 and the second preamble detector 302 are both active and scanning the incoming Signal 1 and Signal 2, respectively for the respective predefined preamble patterns. When the first preamble detector 301 detects a preamble, it asserted the PHY1 signal to the first demodulator 311. This allows the first demodulator 311 to exit low power mode and begin demodulating the incoming bit stream. The multiplexer 320 is also configured to pass data from the first demodulator 311 to the rest of the system. Note that the second demodulator 312 may never exit low power mode during this transaction. Further, while not shown, the PHY1 signal may also be received by the second preamble detector 302, indicating that it may stop scanning for a preamble and thereby putting the second preamble detector 302 in low power mode. Similarly, if the second PHY mode is detected by the second preamble detector 302, the second demodulator 312 may exit low power mode and begin demodulating the incoming bit stream. The multiplexer 320 is also configured to pass data from the second demodulator 312 to the rest of the system. Note that the first demodulator 311 may never exit low power mode during this transaction.

Of course, if the preamble detectors require demodulated signals (Signal 1 and Signal 2), the associated demodulators cannot be put in a low power mode, since they need to provide these demodulated signals to the preamble detectors. However, if the differentiated phase is used as Signal 1 and Signal 2 by the preamble detector, then the rest of the circuitry in the demodulator, such as the symbol timing recovery, may be put in a low power mode. Further, if the preamble detector only requires I and Q, then the entire demodulator could be put in a low power mode when not actively demodulating the incoming bit stream.

Figure 4:
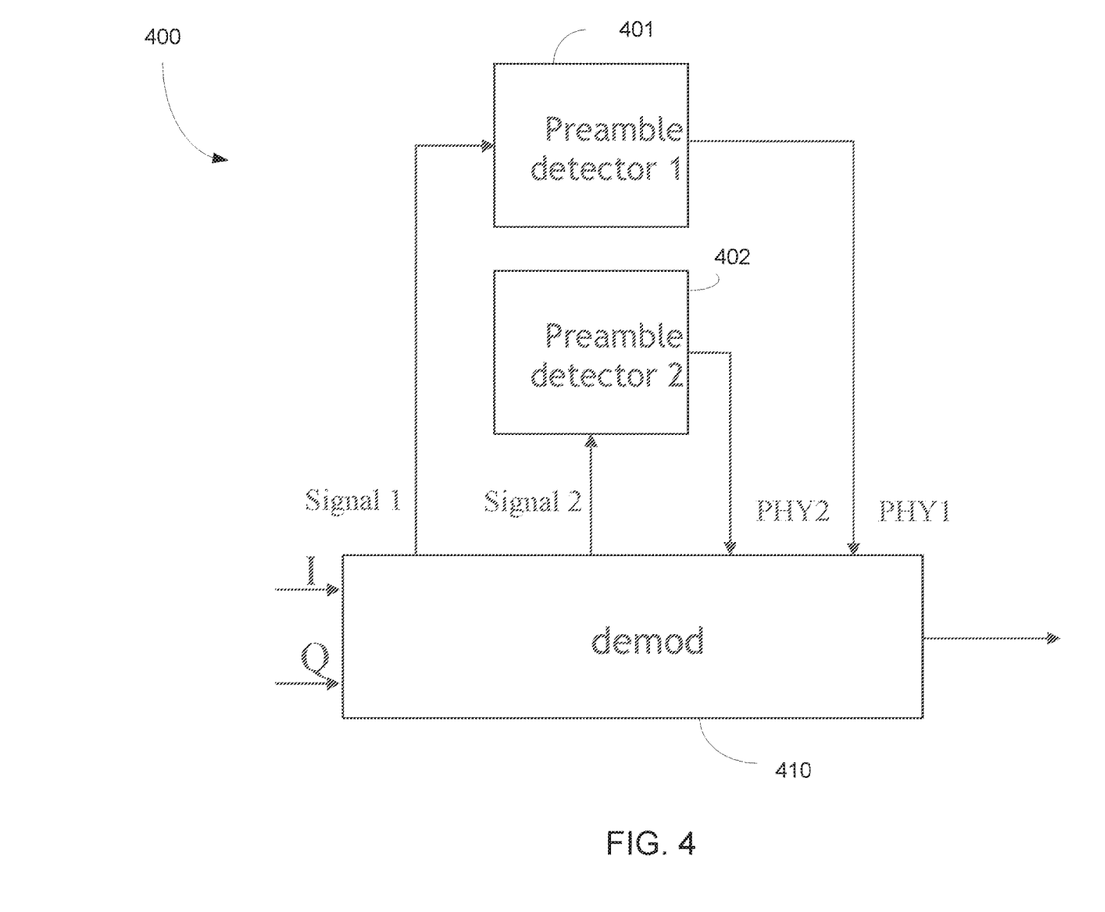
FIG. 4 is a block diagram of preamble detector and demodulator according to another embodiment.

FIG. 4 shows yet another embodiment of a multimode demodulator 400. In this embodiment, there are two preamble detectors; a first preamble detector 401 and a second preamble detector 402. These preamble detectors may operate in the same manner as the preamble detectors of FIG. 3 and therefore will not be described further.

The multimode demodulator 400 utilizes a single demodulator 410. This demodulator 410, like that shown in FIG. 1, is capable of decoding the incoming bit stream in accordance with at least two different PHY modes. Thus, the incoming bit stream is provided to each of the preamble detectors. Each preamble detector continuously scans the incoming bit stream for its respective preamble pattern. When a preamble pattern is decoded, an indication of that PHY mode is transmitted to the demodulator 410, which demodulates the incoming bit stream in accordance with that PHY mode. The output from the demodulator 410 is then forwarded to the rest of the device. Note that a multiplexer is not needed, as only one demodulated output is created by the demodulator 410 in this embodiment. In some embodiments, the demodulator 410 has a first part that demodulates the first PHY mode and a second part that demodulates the second PHY mode. The demodulator 410 may be implemented using circuitry that assists a DSP in performing these functions. In some embodiments, the demodulator 410 has a first part, comprising circuitry used to assist the DSP in demodulating the first PHY mode and a second part, comprising circuitry used to assist the DSP in demodulating the second PHY mode. In other embodiments, the demodulator 410 may be a dedicated circuit, having a first part for demodulating the first PHY mode and a second part for demodulating the second PHY mode. Regardless of implementation, the first and second parts may independently enter and exit a lower power mode, based on which PHY mode is detected, as was described with reference to FIG. 3.

Figure 5:
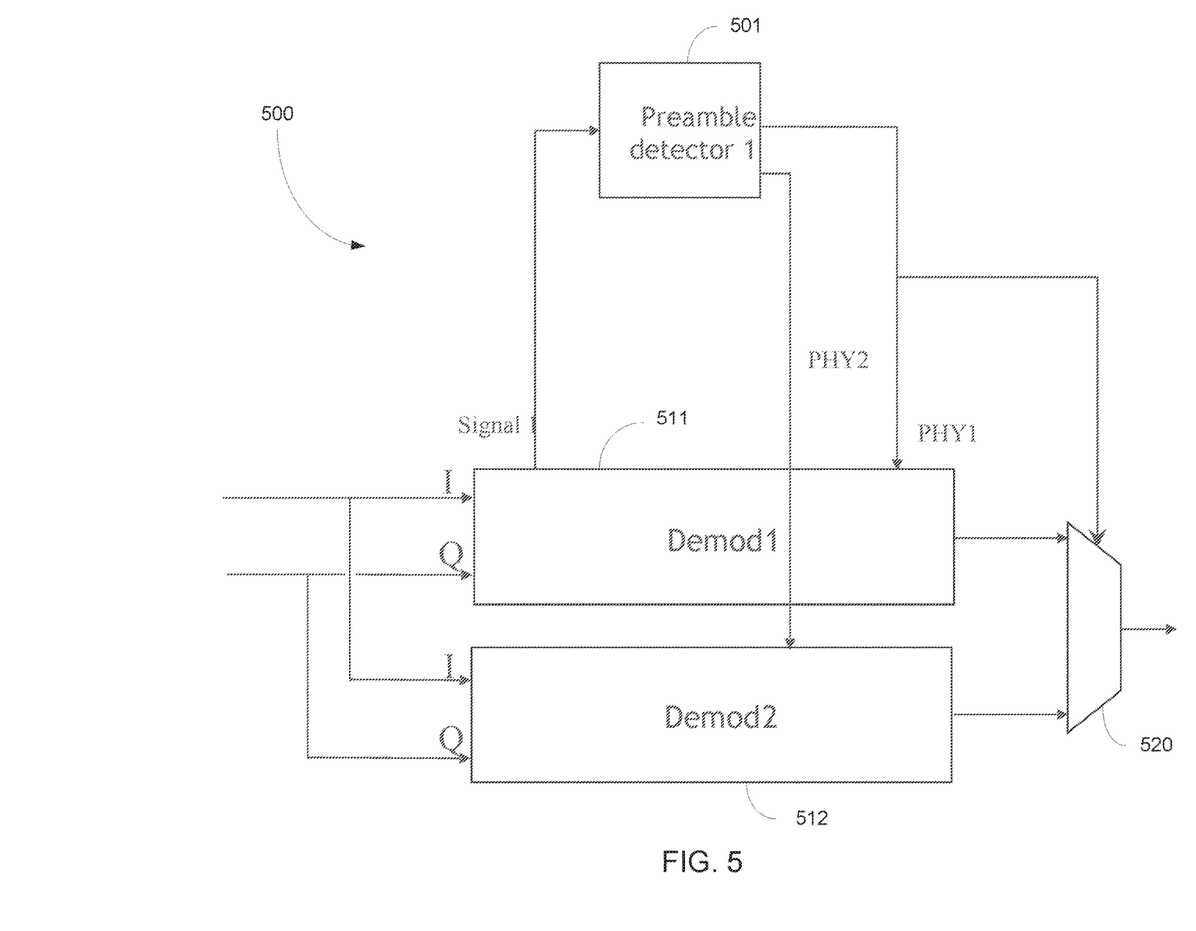
FIG. 5 is a block diagram of preamble detector and demodulator according to another embodiment.

FIG. 5 shows another embodiment of a multimode demodulator 500. In this embodiment, there is a single preamble detector 501, which is capable of detecting a preamble in accordance with one PHY mode. In this respect, the preamble detector 501 is similar to the preamble detectors shown in FIGS. 3 and 4. In this embodiment, there is a first demodulator 511 and a second demodulator 512. The first demodulator 511 and the second demodulator 512 may each be dedicated circuits, or may each include a DSP having associated circuitry to demodulate the respective PHY mode.

The first demodulator 511 and the preamble detector 501 are dedicated to detecting and decoding the incoming bit stream in accordance with a first PHY mode. As such, the first demodulator 511 is similar to the first demodulator 311 shown in FIG. 3.

The second demodulator 512 operates without a preamble detector. As such, the second demodulator 512 is active by default and enters low power mode when the preamble detector 501 indicates that the first PHY mode has been detected. The second demodulator 512 receives the incoming bit stream and may continuously scan that incoming bit stream for the SFD 12 (see FIG. 2). The multiplexer 520 outputs the data stream based on the output from the preamble detector 501. If the preamble detector 501 detects a preamble, the multiplexer 520 selects the first demodulator 511. Otherwise, the second demodulator 512 is selected.

In a variation of FIG. 5, the first demodulator 511 may also be active by default. Additionally, like the second demodulator 512, the first demodulator 511 may scan the incoming bit stream for the SFD. In this configuration, the output of the preamble detector 501 may be provided to the multiplexer 520 to select the appropriate output stream.

Of course, other embodiments are also possible. For example, while FIGS. 3-5 illustrate two preamble detectors and/or two demodulators, these configurations can be expanded to detect and decode an arbitrary number of different PHY modes. Thus, the present disclosure is not limited to only two PHY modes. However, in all embodiments, the system includes a preamble detector capable of detecting at least one preamble according with one PHY mode, and a demodulator capable of deciding the incoming bit stream according to any of the supported PHY modes.

Additionally, FIG. 1 shows an interface that includes a bit stream between the preamble detector 201 and the multimode demodulator 202. In certain embodiments, this bit stream may be at least one of the Signal 1 and Signal 2 that are described with respect to FIGS. 3-5.

Furthermore, the low power operation described with respect to FIGS. 3-5 are equally applicable to FIG. 1. As described above, the multimode demodulator 202 may include a first part that demodulates the first PHY mode and a second part that demodulated the second PHY mode. As described above, this may be implemented using a dedicated circuit or using circuitry, having a first and second part, that assists a DSP in performing these functions. During operation, the first part may be put in a lower power mode when the first PHY mode is not detected. Likewise, the second part may be put in a lower power mode when the second PHY mode is not detected. Other configurations, such as described with respect to FIGS. 3-5, are also possible with the multimode demodulator 202 of FIG. 1. For example, two preamble detectors may be employed with a multimode demodulator 202. In other words, first demodulator 311 and second demodulator 312 may be the first and second parts of a multimode demodulator, respectively.

Additionally, the multimode demodulator may be employed with the preamble detector of FIG. 5. In this configuration, the second part of the multimode demodulator may remain operational and look for the SFD, until preamble detector determines that the first PHY mode is being used. The first part of the multimode demodulator may only exit the lower power mode when the preamble detector determines that the first PHY mode is being used. In other words, first demodulator 511 and second demodulator 512 may be the first and second parts of a multimode demodulator, respectively.

In each of the embodiments illustrated in the figures, the preamble detectors and the demodulators are shown as separate components. However, in certain embodiments, the preamble detectors and the demodulators may be implemented using shared hardware. For example, a DSP may be shared by the preamble detectors and the demodulators. Thus, the figures illustrate a functional separation between these components, while the physical implementations may have one or more shared elements.

In operation, a sending node may use a default PHY mode when attempting to establish communication with other nodes. Once connections have been made to other nodes, the sending node may attempt to communicate with these nodes using a different PHY mode. Thus, the sending node may transmit a packet to a previously identified neighboring node using a different PHY mode. If the neighboring node fails to respond, the sending node may conclude that the receiving node does not support this PHY mode. If the receiving node responds, then the sending node determined that it may use this PHY mode for all communications with that node.

The ability to utilize higher bandwidth PHY modes may determine on a number of factors, including the signal-to-noise ratio between two nodes, and the PHY modes supported by those two nodes. For example, if two nodes, which are both capable of higher speed PHY mode operation, are disposed far apart or within a noisy environment, these nodes may be incapable of operating at that higher speed PHY mode.

Figure 6:
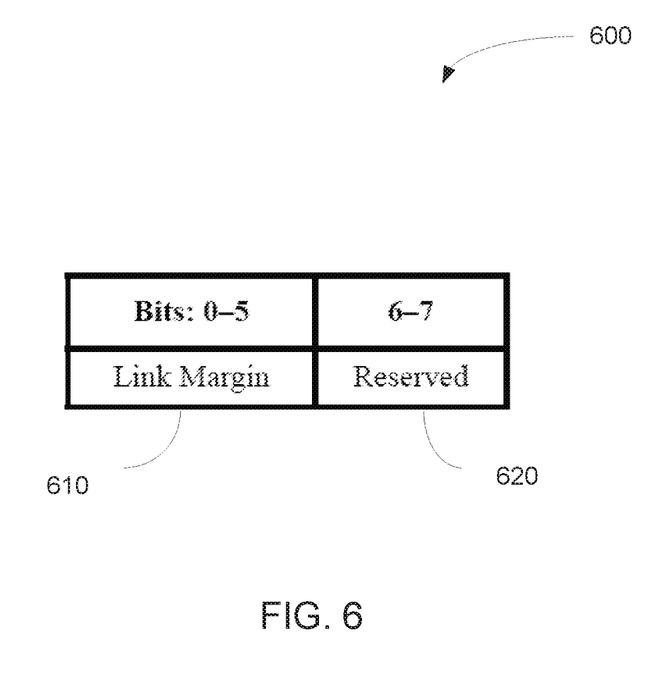
FIG. 6 shows a link margin field according to one embodiment.

In certain embodiments, this issue may be addressed by having nodes provide an indication of their link margin to sending nodes. For example, the RS-GFSK. PHY defined in IEEE802.15.4q includes a link margin field which may be incorporated into ACK packets. For example, this field may be included in the ACK packet if the node supports higher PHY nodes. FIG. 6 shows a representative of the link margin information element 600 according to one embodiment. The link margin information element 600 includes a 6 bit field 610, which indicates the link margin for the most recent transmission received from the sending node. The link margin is defined as that actual received signal power, less a predetermined receiver power. The 6 bit field may be used to represent a twos-complement value between −31 dB and 32 dB, in steps of 1 dB. Thus, a positive number includes that the receiver has link margin, while a negative value indicates that the link is noisier than desired. In other words, this field 610 provides an indication of the link quality. The link margin information element 600 also includes a field 620 having 2 reserved bits.

Figure 7:
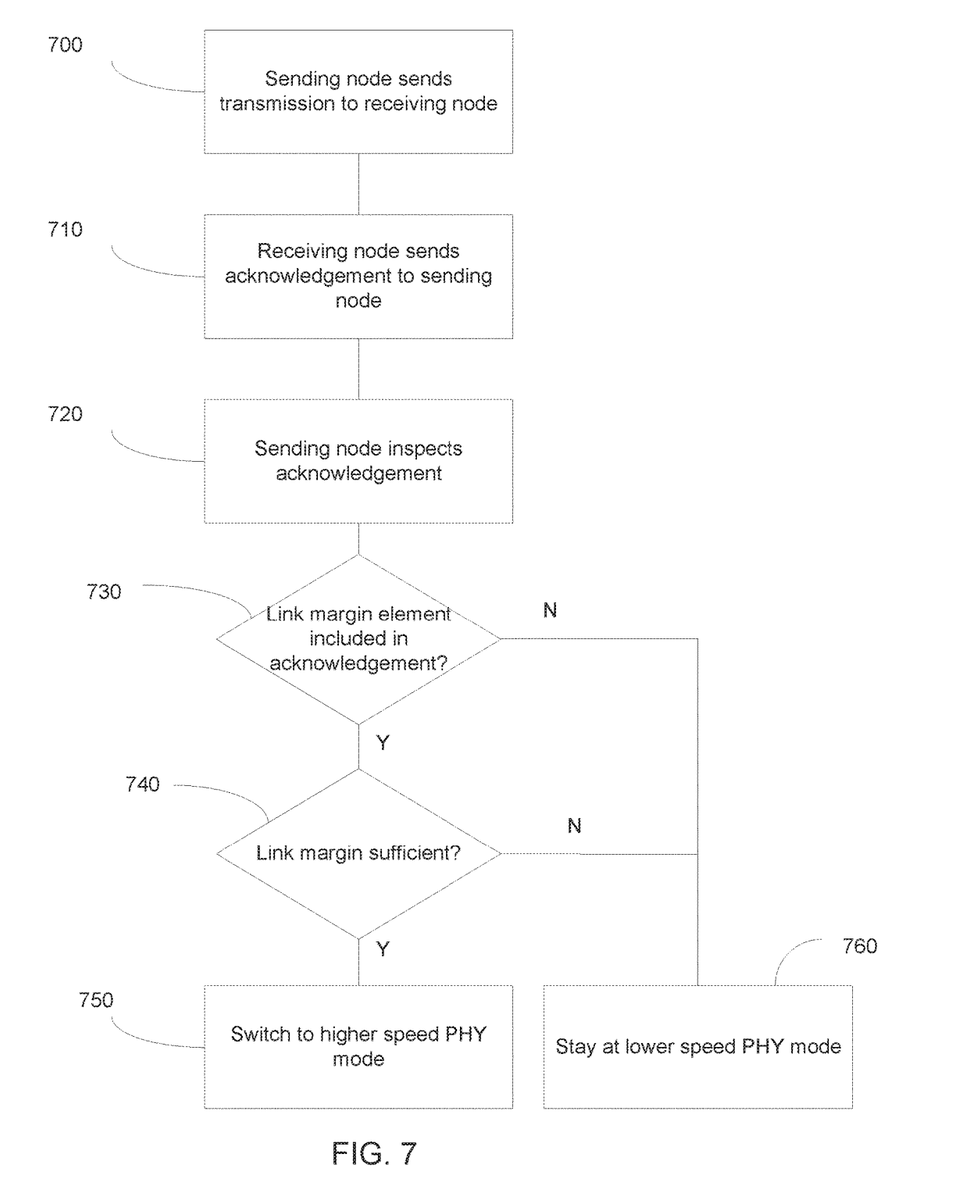
FIG. 7 is a flowchart showing a negotiation for PHY mode selection according to a first embodiment.

FIG. 7 shows a flow chart which can be used to negotiate a PHY mode between two nodes. First, as shown in Box 700, the sending node sends a transmission to the receiving node using a first, or default, PHY mode. The receiving node then replies by sending an acknowledgement to the sending node, as shown in Box 710. The sending node then inspects the acknowledgement as shown in Box 720. First, it is determined whether the link margin element (see FIG. 6) is contained in the acknowledgement, as shown in Box 730. The presence of the link margin element in the acknowledgement may be indicative that the receiving node supports at least one higher speed PHY. If there is a link margin element, the sending node then determines whether the link margin is sufficiently high to support a higher speed PHY mode, as shown in Box 740. For example, the sending node may compare the received link margin to a first threshold to determine if it is sufficiently high. If either or both of the conditions described in Boxes 730 and 740 are met, the sending node will transmit packets to the receiving node using the higher speed PHY mode, as shown in Box 750. If both of these conditions are not satisfied, the sending node will continue to use the default PHY node, as shown in Box 760.

Further, if the sending node switches to the higher speed PHY, as shown in Box 750, there need not be any explicit communication regarding this switch. Rather, the sending node simply sends a packet to the receiving node using the higher speed PHY. The receiving node, which employs the system shown in FIG. 1, automatically determines the PHY mode based on the incoming preamble and demodulates according to the detected PHY mode.

Thus, the use of the link margin information field allows the sending and receiving nodes to avoid a time and power consuming negotiation process.

The higher speed PHY has a higher effective information bit rate than the default PHY mode, and may be used when the link margin exceeds a predetermined first threshold. In certain embodiments, the default or lower speed PHY mode described in FIG. 7 may be a DSSS O-QPSK protocol, such as that defined in IEEE802.15.4-2015. The higher speed PHY mode may be a GMSK protocol, such as the RS-GFSK PHY defined in IEEE802.15.4q. Of course, other protocols may be employed. Rather, FIG. 7 shows the ability to use a field that is part of the acknowledgement to replace the need for a negotiation process.

Figure 8:
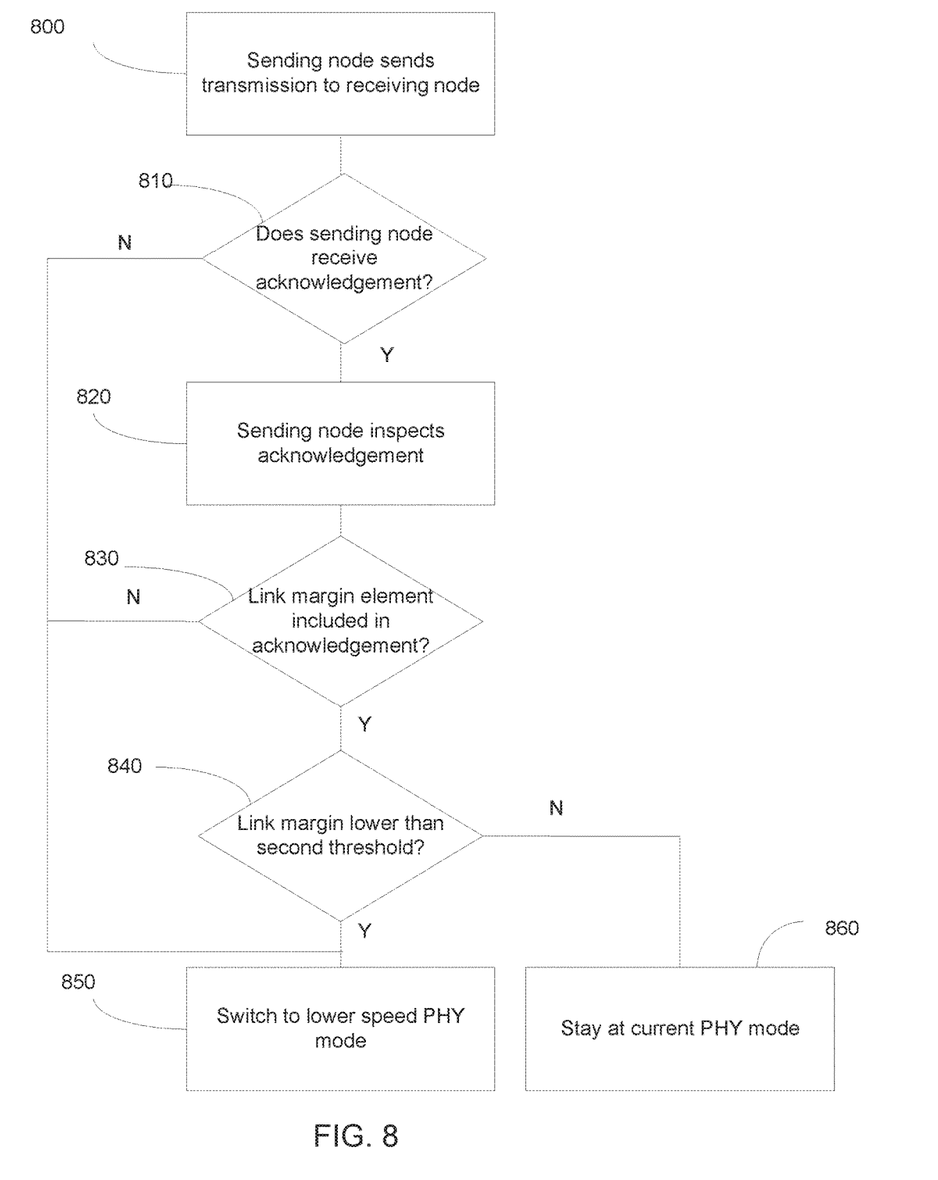
FIG. 8 is a flowchart showing a negotiation for PHY mode selection according to a second embodiment.

In certain embodiments, the sending node may have previously selected the higher speed PHY mode. However, due to changes in the environment, such as increased noise or placement of one of the nodes, the link margin, as reported by the receiving node, may decrease. If the link margin decreases below a second threshold, the sending node may revert to the lower speed PHY mode. The flowchart, shown in FIG. 8, shows how a sending node may determine that a lower speed PHY mode should be used. The sending node sends a transmission to the receiving node, as shown in Box 800. In Box 810, the sending node determines whether an acknowledgement has been received. If an acknowledgement was received, the sequence continues to Box 820. However, if an acknowledgement is not received, this may be that the previous transmission was not received by the receiving node due to insufficient link budget. By lowering the PHY speed, the link budget increases and may be sufficient for a successful link. Thus, if an acknowledgement was not received, the sending node switches to the lower speed PHY mode, as shown in Box 850. As in FIG. 7, the sending node then inspects the acknowledgement and determines whether a link margin element is included, as shown in Boxes 820, 830. If a link margin element is not included, the sending node may revert to the lower speed PHY mode. Finally, in Box 840, the sending node compares the link margin received from the receiving node to a second threshold, which is lower than the first threshold used in FIG. 7. If the link margin is less than this second threshold, the sending node may switch to a lower speed PHY mode, as shown in Box 850. Otherwise, the sending node stays at the current PHY mode, as shown in Box 860.

Further, it is noted that the PHY mode does not have to be the same in both directions. For example, a first node may be battery powered while a second node is connected to an electrical outlet. In this configuration, the second node may send with a higher transmit power. Thus, the first node may report a high link margin, causing the second node to transmit using the higher PHY mode. However, the first node may transmit at a lower power level, causing the second node to report a lower link margin. In this case, the first node would continue transmitting using the lower speed PHY mode. However, this asymmetry is not problematic, as both the first node and the second node can automatically detect the PHY mode being used based on the received preamble.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system adapted to receive and demodulate transmissions sent using one of at least two physical layer (PHY) modes based on a preamble contained in the transmission, comprising:
a wireless receiver;
a circuit comprising a preamble detector capable of detecting the preamble sent using exactly one PHY mode wherein the preamble detector is capable of detecting a preamble sent using only a first PHY mode; and
a circuit comprising a demodulator configurable to demodulate at least two PHY modes, where the demodulator is configured based on an output from the preamble detector, wherein the transmissions utilize an IEEE 802.15 format,
wherein a first part of the demodulator demodulates according to the first PHY mode and a second part of the demodulator demodulates according to a second PHY mode,
wherein the second part of the demodulator defaults to an operational state and the first part of the demodulator defaults to a low power state; and
wherein the first part of the demodulator enters an operational state based on the output from the preamble detector indicating that the first PHY mode was detected.

2. The system of claim 1, wherein the second part of the demodulator enters the low power state based on the output from the preamble detector indicating that the first PHY mode was detected.

3. The system of claim 1, wherein the at least two PHY modes comprises a first PHY mode and a second PHY mode and wherein the first PHY mode is a O-QPSK (Offset Quadrature Phase Shift Keying) PHY based on a spread spectrum DSSS and the second PHY mode is a GMSK (Gaussian Minimum Shift Keying) PHY.

4. The system of claim 1, wherein the wireless receiver comprises a channel filter, and an output of the preamble detector is used to adjust a bandwidth of the channel filter.

5. A method of negotiating a PHY mode to be used for wireless communications between two nodes, comprising:
sending a first packet from a sending node to a receiving node using a first PHY mode;
receiving, at the sending node, a response to the first packet from the receiving node, containing an indication of link quality between the sending node and the receiving node;
selecting a PHY mode, at the sending node, for a second packet based on the link quality;
sending the second packet from the sending node to the receiving node using the selected PHY mode; and
determining automatically, at the receiving node, the PHY mode used for the second packet based on a preamble of the second packet, wherein the receiving node comprises:
a wireless receiver;
a circuit comprising a preamble detector capable of detecting a preamble sent using exactly one PHY mode; and
a circuit comprising a demodulator configurable to demodulate at least two PHY modes, wherein a first part of the demodulator demodulates according to the first PHY mode and a second part of the demodulator demodulates according to a second PHY mode, where the demodulator is configured based on an output from the preamble detector, wherein the transmissions utilize an IEEE 802.15 format,
wherein the preamble detector provides a first output to the first part of the demodulator indicating that the first PHY mode was detected and the first part of the demodulator enters an operational state if the first output indicates that the first PHY mode was detected and remains in a low power mode if the first output does not indicate that the first PHY mode was detected.

6. The method of claim 5, wherein the selected PHY mode has a higher effective information bit rate than the first PHY mode when the link quality exceeds a predetermined first threshold.

7. The method of claim 5, wherein the selected PHY mode has a lower effective information bit rate than the first PHY mode when the link quality is less than a predetermined second threshold.

8. A system adapted to receive and demodulate transmissions sent using one of at least two physical layer (PHY) modes based on a preamble contained in the transmission, comprising:
a wireless receiver;
a circuit comprising a preamble detector capable of detecting the preamble sent using exactly one PHY mode;
a circuit comprising a first demodulator adapted to demodulate a first PHY mode;
a circuit comprising a second demodulator adapted to demodulate a second PHY mode; and
a multiplexer to select an output from the first demodulator or an output from the second demodulator, based on an output from the preamble detector, wherein the transmissions utilize an IEEE 802.15 format,
wherein the preamble detector provides a first output to the first demodulator indicating that the first PHY mode was detected and the first demodulator enters an operational state if the first output indicates that the first PHY mode was detected and remains in a low power mode if the first output does not indicate that the first PHY mode was detected.

9. The system of claim 8, wherein the preamble detector provides a second output to the second demodulator indicating that the first PHY mode was detected and the second demodulator transitions to a low power mode if the second output does indicate that the first PHY mode was detected.

10. The system of claim 8, wherein the first PHY mode is a O-QPSK (Offset Quadrature Phase Shift Keying) PHY based on a spread spectrum DSSS and the second PHY mode is a GMSK (Gaussian Minimum Shift Keying) PHY.

11. The system of claim 8, wherein the wireless receiver comprises a channel filter, and an output of the preamble detector is used to adjust a bandwidth of the channel filter.

12. The method of claim 5, wherein the selected PHY mode is selected from the group consisting of a O-QPSK (Offset Quadrature Phase Shift Keying) PHY based on a spread spectrum DSSS and a GMSK (Gaussian Minimum Shift Keying) PHY.

* * * * *